(12) United States Patent
Heirich

(10) Patent No.: US 6,976,871 B2
(45) Date of Patent: *Dec. 20, 2005

(54) CONNECTOR REVEAL

(75) Inventor: Douglas L. Heirich, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/976,050

(22) Filed: Oct. 28, 2004

(65) Prior Publication Data

US 2005/0059297 A1 Mar. 17, 2005

Related U.S. Application Data

(63) Continuation of application No. 09/476,406, filed on Dec. 30, 1999, now Pat. No. 6,814,613.

(51) Int. Cl.[7] ............................................. H01R 13/73
(52) U.S. Cl. ...................... 439/553; 439/552; 439/564; 174/66; 220/3.8
(58) Field of Search ............................ 439/540.1, 564, 439/553, 562, 552, 573, 248; 361/679, 683, 361/685

(56) References Cited

U.S. PATENT DOCUMENTS

| 3,636,236 | A | * | 1/1972 | Smith | 174/66 |
| 3,816,679 | A | * | 6/1974 | Hotchkiss | 200/51.09 |
| 3,902,625 | A | * | 9/1975 | Schmidhuber | 220/246 |
| 4,334,630 | A | * | 6/1982 | Bergin | 220/300 |
| 6,064,005 | A | * | 5/2000 | Raasch | 174/66 |

* cited by examiner

Primary Examiner—Gary Paumen
(74) Attorney, Agent, or Firm—Henneman & Saunders; Larry E. Henneman, Jr.

(57) ABSTRACT

A case (12) for a computer monitor (10) having a tub (16) with a case aperture (38) therein adapted for receiving a subpanel (26). The subpanel (26) has a plurality of electrical connectors 28 which are user accessible thereby. A beveled flange (40) on the subpanel (26) is received within a receiving flange (44) on the case aperture (38). A structural grid (32) within the case (12) has a flexible portion (34) which includes an electronics enclosure (33) having a screw receiving aperture (42) therein such that a screw (30) is passed through a subpanel screw aperture (48) in the subpanel (26) and secured within the screw receiving aperture (42), thereby flexing the flexible portion (34) to hold the subpanel (26) firmly within the case aperture (38).

13 Claims, 7 Drawing Sheets

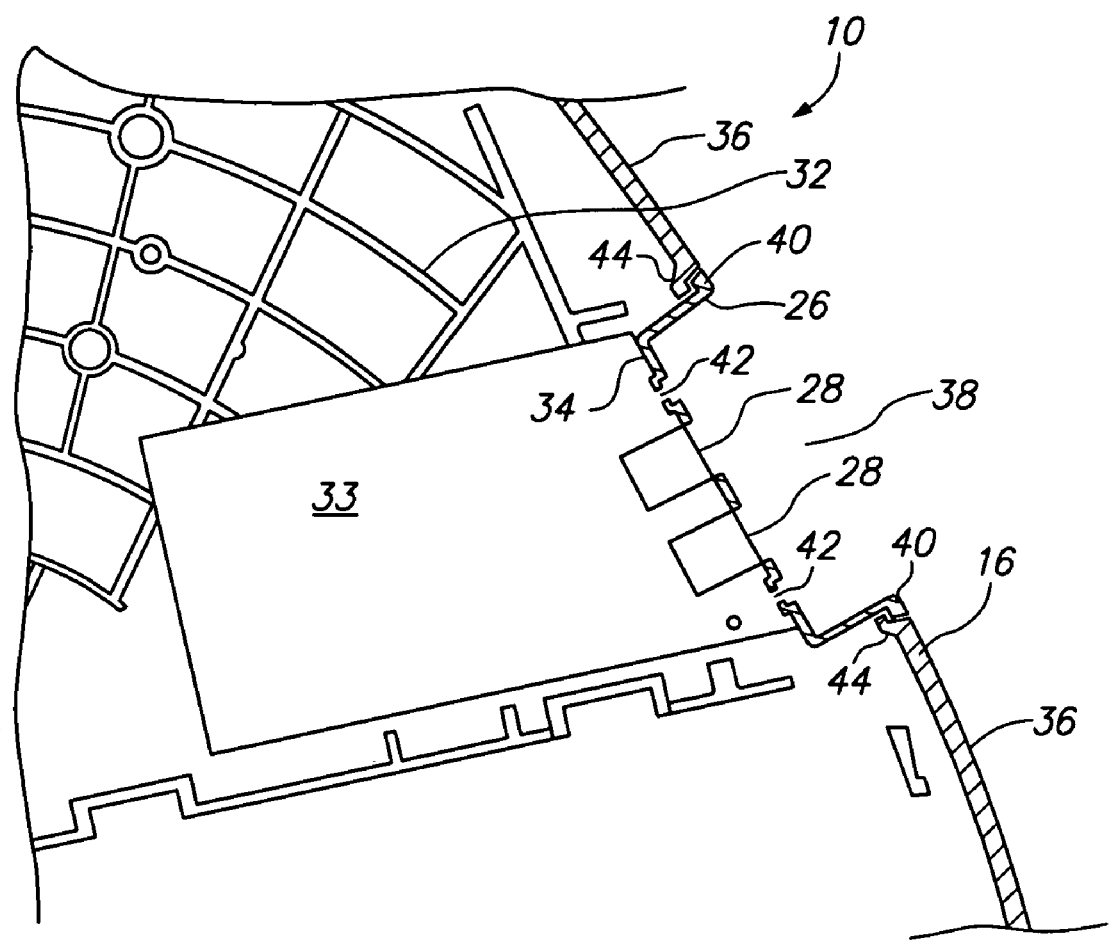

CONNECTOR REVEAL

RELATED APPLICATIONS

This patent application is a continuation of U.S. patent application Ser. No. 09/476,406, filed Dec. 30, 1999 by the same inventor, which issued Nov. 9, 2004 as U.S. Pat. No. 6,814,613 and is incorporated by reference herein in its entirety.

TECHNICAL FIELD

The present invention relates to the field of mechanical construction, and more particularly to an improved connector reveal for an electronic component case. The predominant current usage of the present inventive improved connector reveal is in the construction of a computer monitor case, wherein it is desirable to have a means to quickly an inexpensively affix a case subpart to the case.

BACKGROUND ART

In the construction of electronic component devices, such as computers, computer monitors, and the like, it is frequently required to have electrical connectors which are accessible from the outside of the case. It is known in the art to attach such connectors to a body subpanel, sometimes a recessed body panel, such that such body panel can be constructed as a separate subcomponent which is affixed to the case during the final assembly thereof. In the prior art, it has frequently been difficult to align such subpanel to the rest of the case such that the subpanel aligns nicely with the surrounding case. A poorly aligned subpanel has often been the result.

In an effort to better cosmetically align such case subpanels in an aperture in the case provided therefore, it has been the practice to try to more precisely manufacture the parts such that they fit together with greater precision. However, such precision manufacturing can be quite expensive and, indeed, there are limits to how precisely and reliably plastic parts can be manufactured. Therefore, while significant expense has been incurred in an effort to solve this problem, a reliable and inexpensive solution has thus far evaded practitioners in the field.

While it would be desirable to have an inexpensive and reliable method and/or apparatus for affixing a body subpanel, or the like, within an aperture provided therefore such that such subpanel is nicely aligned and centered within the aperture, no such method and/or apparatus has existed in the prior art.

DISCLOSURE OF INVENTION

Accordingly, it is an object of the present invention to provide a method and apparatus for easily and inexpensively affixing a case subpanel within an aperture in the case.

It is another object of the present invention to provide a method and apparatus which will result in a subpanel being consistently centered in an aperture provided therefor.

It is yet another object of the present invention to provide a computer component housing having a reveal which is nicely aligned in relation to a surrounding panel.

It is still another object of the present invention to provide a computer component housing which is inexpensive to produce, both in time and material.

It is yet another object of the present invention to provide a component housing subpart which is easily affixed to the remainder of the component housing.

It is still another object of the present invention to provide a component housing subpart which is rugged in construction.

Briefly, an embodiment of the present invention is a computer monitor having a case made up of several component parts. One of such parts, a "tub" in this present example, has an aperture therein provided for accepting a subpanel. The subpanel is adapted for containing a plurality of electrical connectors such that the electrical connectors can be accessed from outside the housing by an end user. A structural grid within the housing has a flexible portion with a grid screw aperture therein, the screw aperture is adapted for accepting a self tapping screw which is passed through a subpanel screw aperture in the subpanel and screwed into the grid screw aperture such that the flexible portion of the grid is caused to flex toward the subpanel, thereby holding the subpanel in place by spring tension. The subpanel has a beveled outer lip for preventing the subpanel from being drawn within the tub, and further for providing a self centering effect within the aperture provided in the tub.

An advantage of the present invention is that a housing subpanel is quickly and easily affixed to a component housing.

A further advantage of the present invention is that a housing subpanel is inexpensive to manufacture.

Yet another advantage of the present invention is that a housing subpanel and associated housing need not be constructed to extremely tight tolerances.

Still another advantage of the present invention is that the subpanel reveal is well aligned within an aperture provided therefor.

Yet another advantage of the present invention is that the subpanel reveal is well secured within the aperture provided therefor.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application

BRIEF DESCRIPTION OF THE DRAWINGS

FIG. 3 is a cross sectional top plan view of a portion of the computer monitor of FIG. 2, taken along line 3—3 of FIG. 2;

BEST MODE FOR CARRYING OUT INVENTION

Figure 1:
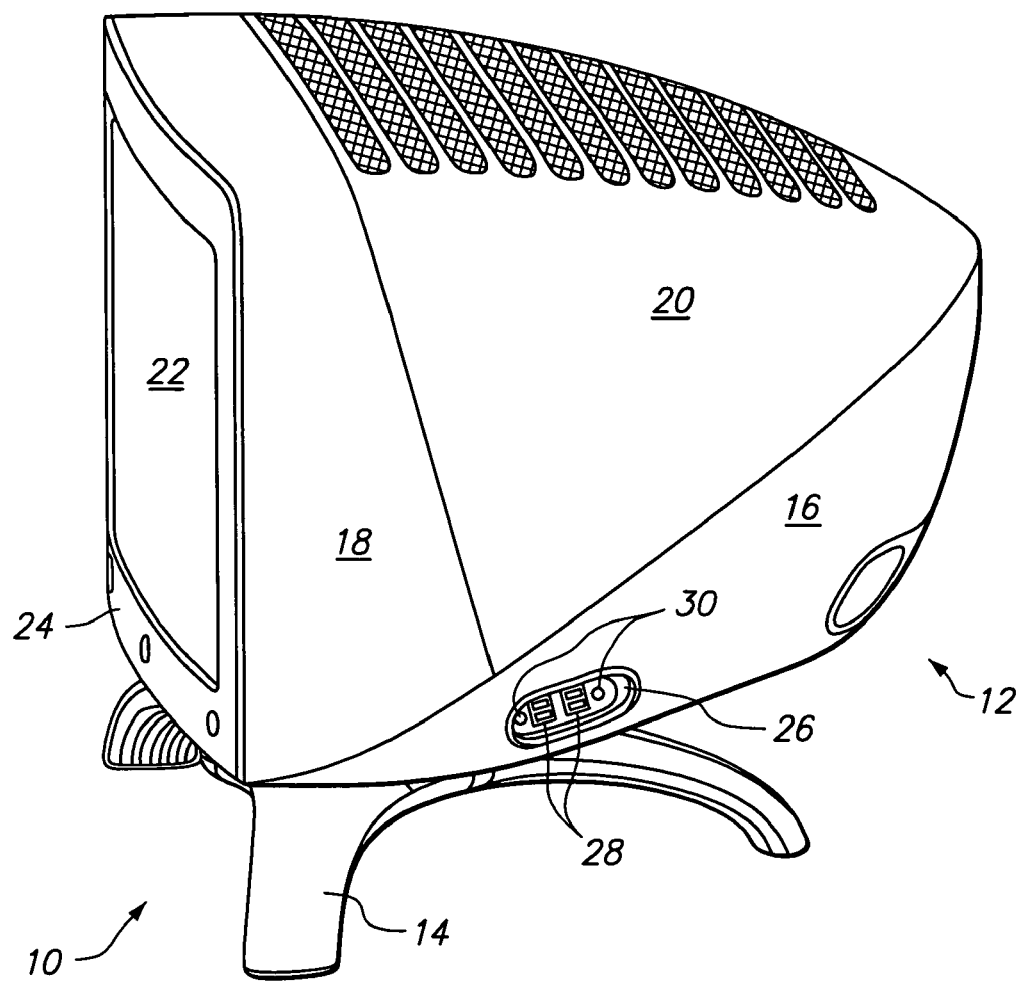
FIG. 1 is perspective view of a computer monitor constructed according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a computer monitor constructed according to the present inventive method. The inventive computer monitor is depicted in a perspective view in FIG. 1 and in a side elevational view in FIG. 2, and is designated therein by the general reference character 10. The computer monitor 10 has a case 12 constructed from component parts including a base 14, a tub 16, a case front 18, a case cover 20, a screen 22 and a bezel 24 generally surrounding the screen 22. Together, tub 16, case front 18, case cover 20, and bezel 24 provide a housing for computer monitor 10. In this example, the screen 22 is the front portion of a cathode ray display tube (concealed within the case 12 in the view of FIG. 1, although it is within the scope of the invention that essentially any type of display screen could be used for the purpose. The cathode ray tube (except the screen 22 portion thereof) and other electronic components of the monitor 10 are not unique to the present invention, and will be omitted from the drawing in order to more succinctly present the present invention. In the view of FIG. 1 can be seen a case subpanel 26 affixed to the tub 16. The subpanel 26 is adapted for accepting a plurality (two in this present example) of electrical connectors 28 which, in this present example, are universal serial bus ("USB") connectors. In particular, subpanel 26 includes a pair of subpanel apertures 27 (FIG. 5A) through which electrical connectors 28 are accessible to an end user on the outside of the case 12. Also in the view of FIG. 1 can be seen screws 30, whereby the subpanel is affixed to the case 12, as will be discussed in more detail hereinafter.

Figure 2:
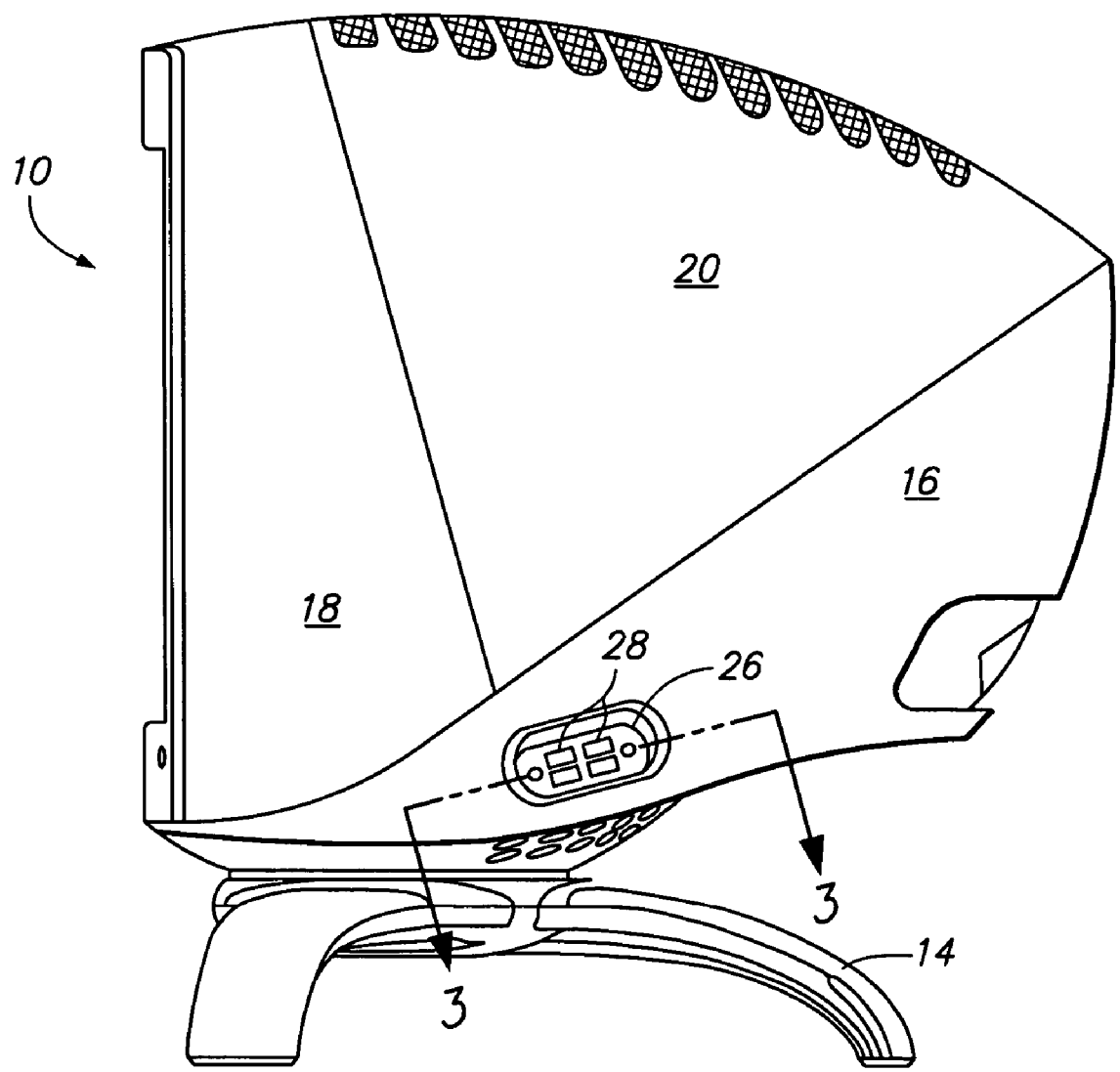
FIG. 2 is a side elevational view of the computer monitor of FIG. 1.

FIG. 3 is a cross sectional view of a portion of the monitor 10, taken along line 3—3 of FIG. 2. In the view of FIG. 3 can be seen a structural grid 32, which serves as a chassis for monitor 10, within the tub 16. The structural grid 32 has a flexible portion 34 whereto the subpanel 26 is affixed. In the particular embodiment shown in FIG. 3, flexible portion 34 includes an electronics enclosure 33 that is part of an electronic component having at least one user accessible subcomponent (e.g., electrical connectors 28). The electronics enclosure 33 is flexibly coupled (connection obscured from view in FIG. 3 by electronics enclosure 33) to structural grid 32. In the view of FIG. 3, it can be seen that the subpanel 26 is shaped such that the electrical connectors 28 (FIG. 1) are recessed in relation to an outer surface 36 of the tub 16. As will be discussed in greater detail, hereinafter, the flexible portion 34 acts as a spring apparatus to hold the subpanel 26 securely in place.

Figure 4A:
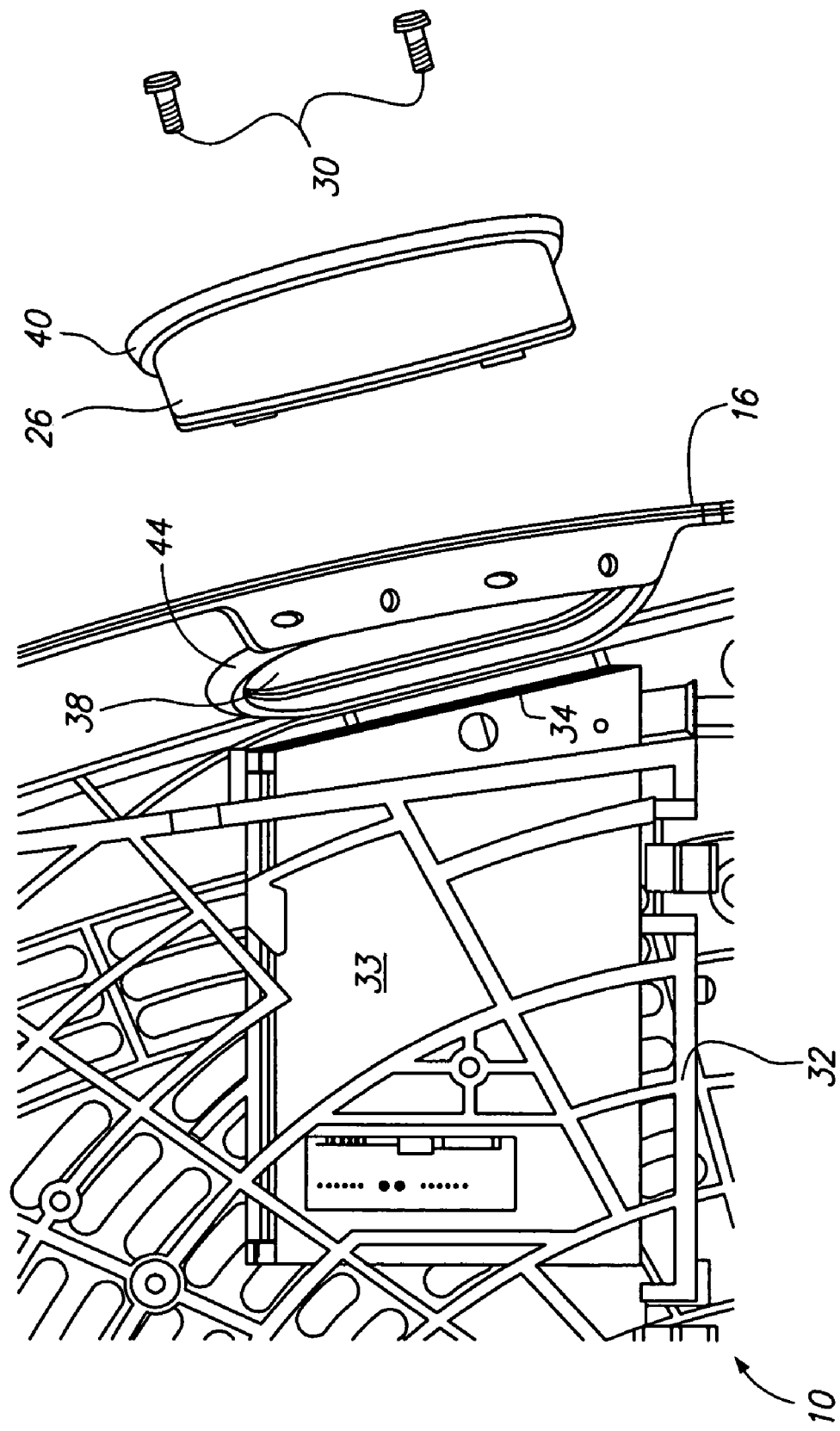
FIG. 4A is an exploded top plan view of a portion of the computer monitor of FIGS. 1 and 2.
Figure 4B:
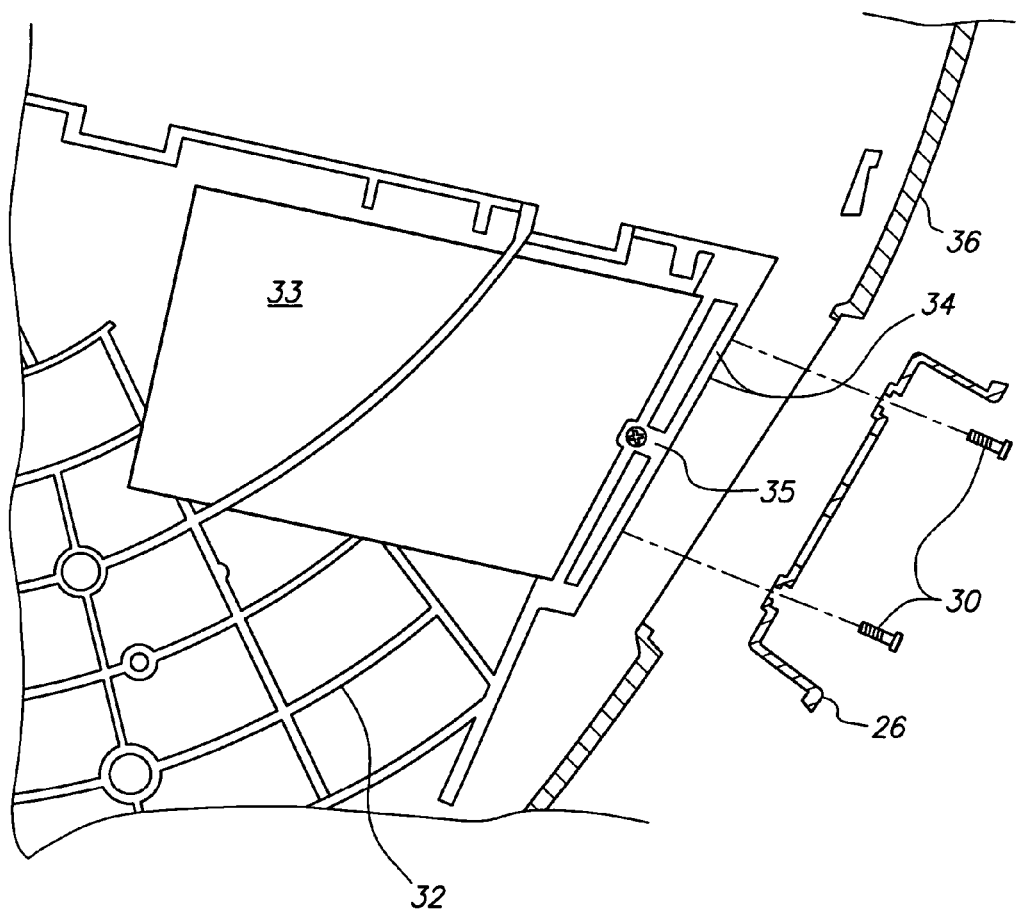
FIG. 4B is an exploded bottom view of the portion of the computer monitor of FIG. 4A.

FIG. 4A is a partially exploded view of the monitor 10, similar to the view of FIG. 3, showing a relevant part thereof. In the view of FIG. 4A, the subpanel 26 is shown detached from the flexible portion 34 of the structural grid 32, and the screws 30 whereby the subpanel 26 is to be attached to the flexible portion 34 can be seen. Flexible portion 34 includes a flexible piece 35 (FIGS. 4B and 5B) of grid 32 (obstructed from view in FIG. 4A by the electronics enclosure 33), which is generally straight when the subpanel 26 is not attached thereto (FIG. 4B) and is flexed into a somewhat curved shape (FIG. 5B) when the screws 30 are drawn tight to affix the subpanel 26 to the flexible portion 34, thereby pulling enclosure 33 in a direction indicated by the directional arrow in FIG. 5B. In the view of FIG. 4A can be seen a case aperture 38 in the tub 16, wherein the subpanel 26 is to be received. A beveled flange 40 around the outer edge of the subpanel 26 is shaped generally like the case aperture 38, but is slightly larger in its outside dimensions than the inside dimensions of the case aperture 38. This prevents the subpanel 26 from being drawn entirely within the tub 16 when the screw 30 is tightened to the flexible portion 34 of the structural grid 32.

In the view of FIG. 3 can be seen two screw receiving apertures 42 adapted for receiving the screws 30 of FIG. 4A. In this example of the invention, the screws 30 are self tapping screws and the screw receiving apertures 42 are merely holes drilled in the electronics enclosure 33 of flexible portion 34 such that the screws 30 will hold tightly in the screw receiving apertures 42. In the view of FIG. 3, it can be seen that, in this example of the invention, the case aperture 38 in the tub 16 has an optional beveled receiving flange for mating with the beveled flange of the subpanel 26, such that the subpanel 26 will tend to be centered within the case aperture 38 when the subpanel 26 is drawn snugly within the case aperture 38 by tightening the screws 30 into the screw receiving apertures 42 of the electronics enclosure 33 of the flexible portion 34.

Figure 5A:
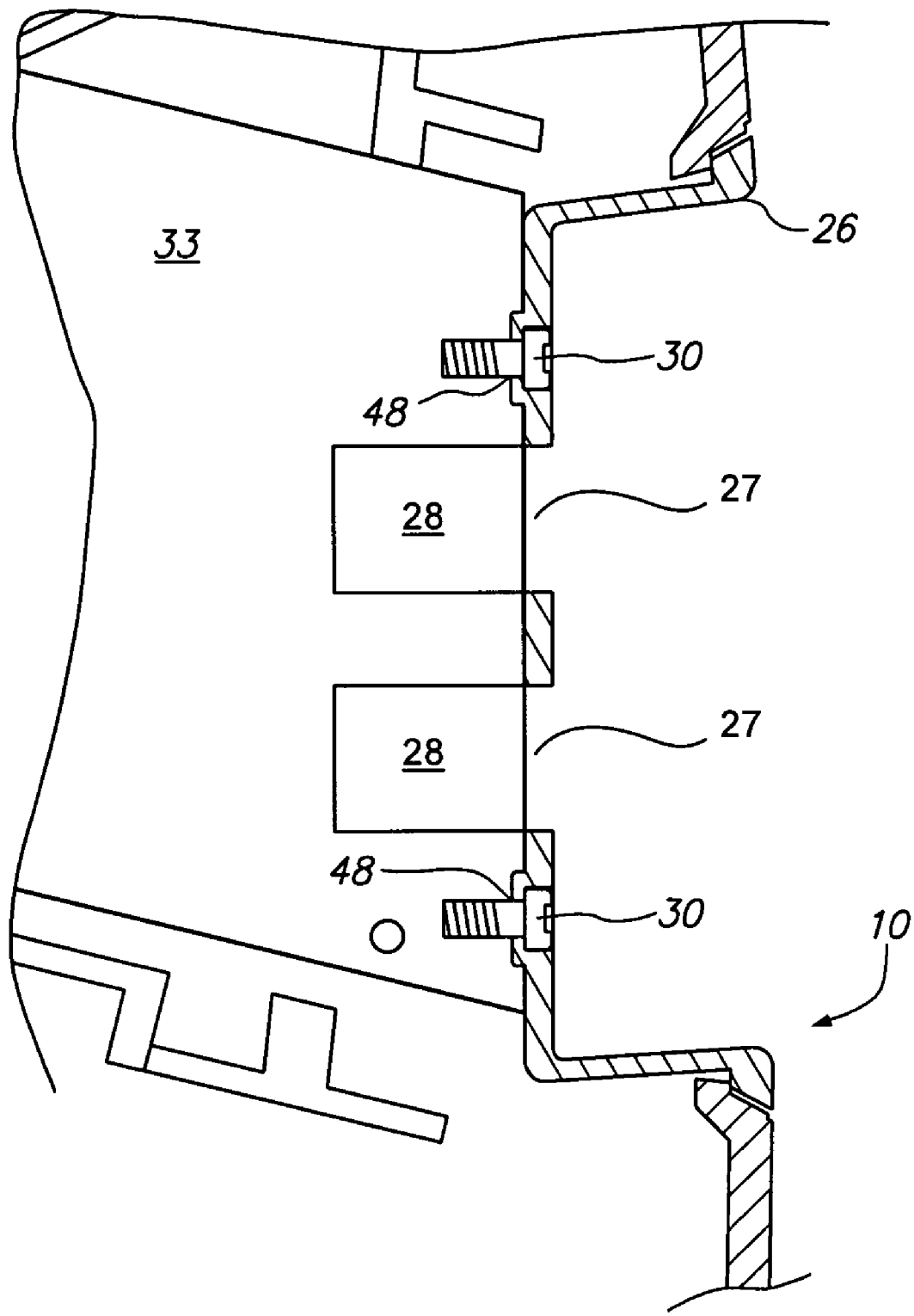
FIG. 5A is a downward cross sectional view of a subpanel, according to the present invention.
Figure 5B:
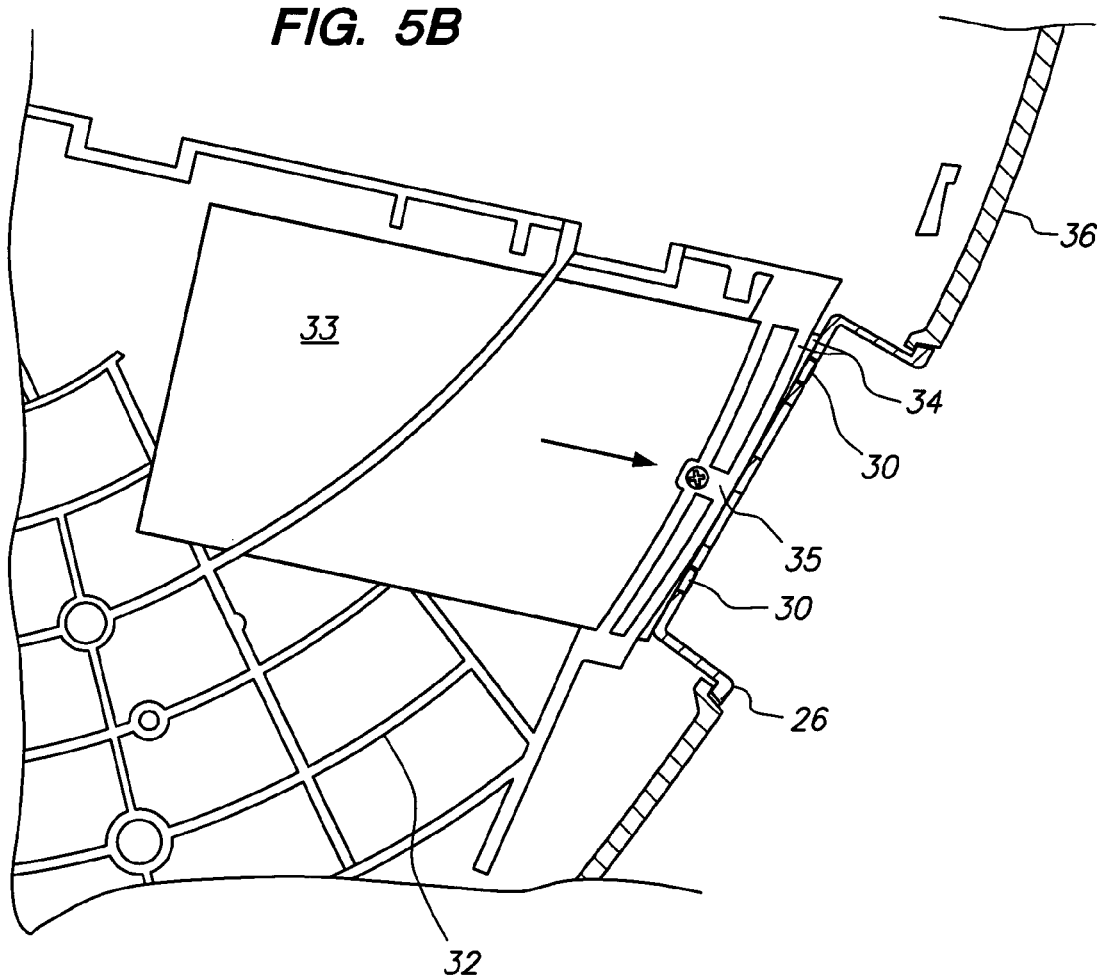
FIG. 5B is an upward cross sectional view of the subpanel of FIG. 5A.

FIG. 5A is a cross sectional view of the subpanel 26 of this presently described embodiment of the invention. In the view of FIG. 5A can be seen subpanel screw apertures 48 wherethrough the screws 30 are passed to secure the subpanel 26 to the screw receiving apertures 42 (FIG. 3). Furthermore, subpanel 26 also includes a plurality of subpanel apertures 27 that are shaped to receive the electrical connectors 28 and serve as access apertures for accessing electrical connectors 28.

Figure 6:
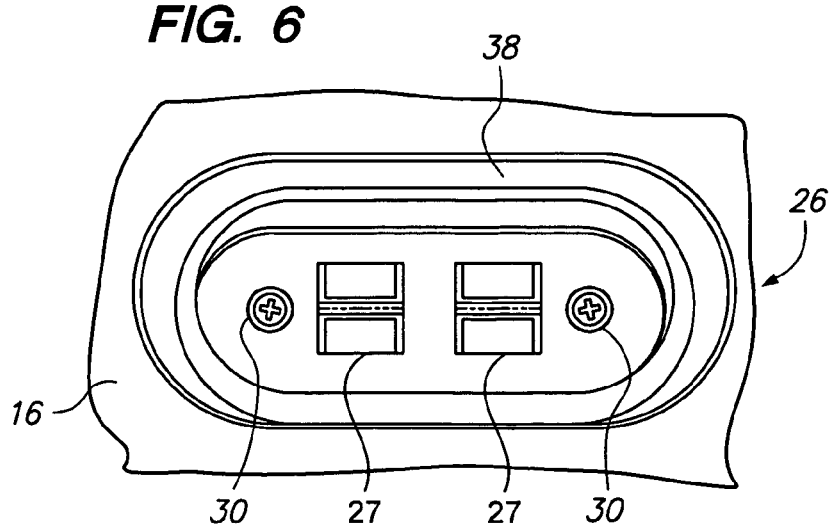
FIG. 6 is an elevational view of the subpanel of FIGS. 5A and 5B within the case of the computer monitor of FIGS. 1 through 4B.

FIG. 6 is an elevational view of a portion of the tub 16, looking directly at the subpanel 26 attached thereto. As can be seen in the view of FIG. 6, the subpanel 26 is generally centered within the case aperture 38 when the screws 30 are tightened to secure the subpanel 26 within the case aperture 38.

Various modifications may be made to the invention without altering its value or scope. For example, since only one flanged surface is necessary to center the subpanel 26 within the case aperture 38, the inventive case 12 could be reconfigured to eliminate either the receiving flange 44 or the beveled flange 40 of the subpanel 26. Another likely modification would be to provide some alternative structure to provide spring tension to pull the subpanel 26 firmly into the case aperture 38.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive subpanel 26, and related structures as described by way of example herein, are intended to be widely used in the construction of housings and cases for electronic equipment, including computer monitors, computers, computer printers, and the like. While the example of the invention, as described herein, is presented as a computer monitor case, this application is not considered to be a restriction on the scope of the application of the invention.

Since the improved case 12 of the present invention may be readily produced and integrated with existing designs for computer monitors and other electronic devices, and since the advantages as described herein are provided, it is expected that it will be readily accepted in the industry. For these and other reasons, it is expected that the utility and industrial applicability of the invention will be both significant in scope and long-lasting in duration.

I claim:

1. An electronics enclosure comprising:
   a chassis;
   an electronic component having at least one user accessible subcomponent and being flexibly mounted to said chassis;
   a housing at least partially enclosing said chassis and said electronic component, said housing defining an opening therein to provide access to said user accessible subcomponents; and
   an engaging device coupled to move said electronic component into alignment with said opening.

2. An electronics enclosure according to claim 1, wherein said engaging device is coupled between said electronic component and said housing.

3. An electronics enclosure according to claim 2, wherein said engaging device includes:
   a subpanel that is larger than said opening; and
   a fastener to attach said subpanel to said electronic component.

4. An electronics enclosure according to claim 3, wherein said subpanel defines apertures shaped to receive said user accessible subcomponent.

5. An electronics enclosure according to claim 4, wherein said user accessible subcomponent is an external electrical connector.

6. An electronics enclosure according to claim 3, wherein at least one of said subpanel and said opening in said housing includes a beveled edge.

7. An electronics enclosure according to claim 1, wherein said electronic component is flexibly coupled to said chassis with a spring.

8. An electronics enclosure according to claim 7, wherein said spring includes a flexible portion of said chassis.

9. An electronics enclosure according to claim 1, wherein said chassis includes support structure that supports said electronic component while allowing said electronic component to slide along an axis passing through said opening in said housing.

10. An electronics enclosure according to claim 9, wherein:
    said electronic component is generally shaped as a rectangular solid; and
    said support structure defines a generally rectangular opening.

11. An electronics enclosure according to claim 9, wherein said electronic component is fastened to a portion of said support structure that biases said electronic component away from said opening in said housing while allowing said electronic component to be drawn toward said opening along said axis.

12. An electronics case comprising:
    a chassis;
    an electronic component;
    a housing at least partially surrounding said chassis and said electronic component, said housing having an access aperture formed therein; and
    means for flexibly mounting said electronic component to said chassis.

13. An electronics case according to claim 12, further including means for aligning said electronic component with said access aperture.

* * * * *